United States Patent
Lin et al.

(10) Patent No.: US 7,532,560 B2
(45) Date of Patent: May 12, 2009

(54) SIGNAL PROCESSING CIRCUIT FOR OPTICAL DISC DRIVERS AND THE RELATED METHOD

(75) Inventors: Jyh-Fong Lin, Taipei Hsien (TW); Yi-Bin Hsieh, Taipei Hsien (TW); Chih-Chang Chien, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 505 days.

(21) Appl. No.: 10/906,541

(22) Filed: Feb. 24, 2005

(65) Prior Publication Data

US 2005/0157626 A1  Jul. 21, 2005

Related U.S. Application Data

(63) Continuation-in-part of application No. 10/064,781, filed on Aug. 16, 2002, now abandoned.

(30) Foreign Application Priority Data

Oct. 18, 2001  (TW) .............................. 90125839 A

(51) Int. Cl.
*G11B 7/00* (2006.01)
*G11B 5/09* (2006.01)

(52) U.S. Cl. .............................. 369/124.11; 369/124.12; 369/124.13; 369/59.15; 369/59.13; 369/47.26

(58) Field of Classification Search ............ 369/124.11, 369/59.13, 59.15, 59.16, 124.12, 124.13, 369/47.25, 47.26, 47.24
See application file for complete search history.

(56) References Cited

U.S. PATENT DOCUMENTS

| 6,141,169 | A | * | 10/2000 | Pietruszynski et al. | ........ 360/67 |
| 6,188,654 | B1 | * | 2/2001 | Kaku et al. | .............. 369/47.27 |
| 6,285,863 | B1 | * | 9/2001 | Zhang | ..................... 455/234.1 |

OTHER PUBLICATIONS

U.S. Appl. No. 10/064,781, filed Aug. 16, 2002, Jyh-Fong Lin.

* cited by examiner

*Primary Examiner*—Wayne R Young
*Assistant Examiner*—Dionne H Pendleton
(74) *Attorney, Agent, or Firm*—Winston Hsu

(57) ABSTRACT

A signal processing circuit for adjusting an input signal and generating a corresponding digital output signal in an optical disk driver is provided. The signal processing circuit includes an attenuator for receiving and attenuating the input signal and then generating an attenuated output signal; a gain controllable amplifier for receiving and amplifying the input signal and then generating an amplified output signal; a control unit providing a control signal and a select signal, the control signal is directed to the attenuator and the gain controllable amplifier for enabling/disabling the attenuator and the gain controllable amplifier and for controlling their gains such that one of the attenuator and gain controllable amplifier is enabled at a time; and a waveform adjuster circuit for adjusting the amplified/attenuated output signal delivered from the gain controllable amplifier or the attenuator so as to generate the digital signal related to the input signal.

5 Claims, 4 Drawing Sheets

SIGNAL PROCESSING CIRCUIT FOR OPTICAL DISC DRIVERS AND THE RELATED METHOD

CROSS-REFERENCE TO RELATED DOCUMENTS

The present application is a continuation-in-part of U.S. application Ser. No. 10/064,781, entitled Signal Processing Circuit for Optical Disc Drivers and the Related Method, filed Aug. 16, 2002.

BACKGROUND OF THE INVENTION

1. Field of the Invention

The present invention relates to a signal processing circuit for adjusting signal amplitude, and more particularly, to a signal processing circuit that selectively enables an attenuator or a gain controllable amplifier coupled in parallel so as to reduce power consumption when converting signal formats of related input signals.

2. Description of the Related Art

The most important characteristics of the modern information society is that every kind of information and knowledge is transmitted, stored, or manipulated in the form of electrical signals. Information in an electrical signal form can be accumulated and be exchanged rapidly, and technology keeps progressing based on the ability to manipulate information in electrical circuits. Basically, information in electrical form cannot be properly manipulated until an electrical circuit adjusts this information into digital form. For example, a reflected signal from a loaded optical disc, which is then read by an optical pickup head, cannot be suitably processed if its format is not converted into a digital format. Since different optical disc drivers usually have different gains at their integrated laser generator and the optical pickup head, and each optical disc usually has a different reflection rate, these different gains and reflection rates will affect the signal amplitude of the reflected one to deviate from the normal. For the sake of adjusting different signal amplitudes and for guaranteeing the adjusted amplitude to be converged within a predetermined value so as to ensure that the input signal can be transformed as a digital form correctly, a conventional signal processing circuit 10 is provided to adjust the signal amplitude and generate a corresponding output signal for further data processing and applications. The conventional signal processing circuit 10 implemented in optical disc drivers is used to process the input signal transformed from the reflected signal aforementioned.

Please refer to FIG. 1, which is a circuit block diagram illustrating a conventional signal processing circuit 10 including an attenuator 16, a gain controllable amplifier 18, a control unit 14, a peak detector circuit 22 and a waveform adjuster circuit 24. The input signal 12 enters to the conventional signal processing circuit 10 shown in FIG. 1 in a differential signal form such that the conventional signal processing circuit 10 also deals with this signal in a differential way. The attenuator 16 receives the input signal 12 through input ends 14A and 14B and then outputs related attenuated signal to the gain controllable amplifier 18. The gain controllable amplifier 18 receives the attenuated signal delivered from the attenuator 16 through input ends 16A and 16B and then outputs an amplified output signal 26 to both the waveform adjuster circuit 24 and the peak detector circuit 22. The gain controllable amplifier 18 has a control pin 20 that receives a control signal provided by the control unit 14. The peak detector circuit 22 is basically a signal envelope detector for evaluating the envelope amplitude of the input signal at the input ends 22A and 22B, then outputting the evaluated envelope amplitude through an output end. Input ends 22A and 22B of the peak detector circuit 22 receive the amplified output signal 26 from the gain controllable amplifier 18, and the output end of the peak detector circuit 22 is connected to the control unit 14. The control unit 14 has an input end and an output end, wherein the output end is connected to the control pin 20 of the gain controllable amplifier 18. The control unit 14 can be a digital signal processor (DSP) or a microprocessor containing internal default values (or thresholds). Please note that the envelope amplitude is the difference between the signals at the input ends 22A and 22B, while the default values or thresholds are used for comparing with the evaluated envelope amplitude so as to determine whether the signals passing through the input ends 22A and 22B are too large or too small. Accordingly, the control unit 14 adjusts the gain of the gain controllable amplifier 18 through the control pin 20 according to the comparison result. The waveform adjuster circuit 24, functioning like a data slicer, can properly transfer an analog signal into a digital one based on a predetermined slice level. The waveform adjuster circuit 24 encompasses input ends 24A and 24B for receiving the output signal 26, and an output end for outputting a digital signal.

The conventional signal processing circuit 10 works as follows. The input signal 12 enters the conventional signal processing circuit 10 via input ends 14A and 14B of the attenuator 16. Firstly, the attenuator 16 attenuates this input signal 12 to restrict the input signal 12 to the input range of the gain controllable amplifier 18. Next, the attenuated signal is transmitted to the gain controllable amplifier 18 in differential form, while the gain controllable amplifier 18 amplifies the attenuated signal and then delivers this amplified one as an output signal 26. This output signal 26 is also transmitted to the peak detector circuit 22 while it is transmitted simultaneously to the waveform adjuster circuit 24 for further processing. The peak detector circuit 22 evaluates the envelope amplitude of the output signal 26 and transmits the evaluated envelope amplitude of the to the control unit 14. The control unit 14 adjusts the gain of the gain controllable amplifier 18 via the control pin 20 according to the evaluated envelope amplitude of the output signal 26. The conventional signal processing circuit 10 can modulate the gain of the gain controllable amplifier 18 and can thus adjust the amplitude of the output signal 26 by means of the control unit 14. If the evaluated envelope amplitude of the output signal 26 is too small, the control unit 14 will increase the gain of the gain controllable amplifier 18 so as to increase that of the output signal 26. Similarly, the control unit 14 will decrease the gain of the gain controllable amplifier 18 if the evaluated envelope amplitude of the output signal 26 is too large.

However, the conventional signal processing circuit 10 has the following drawbacks. The first one is that the attenuator 16 and the gain controllable amplifier 18 work simultaneously, that is, they both consume power while the input signal 12 is being format-converted. The second one is that the input signal 12 is firstly processed by the attenuator 16 and then by the gain controllable amplifier 18, so the gain of the gain controllable amplifier 18 must be large enough to compensate a loss caused by the attenuator 16. Those skilled in the art know that the gain controllable amplifier 18 has a fixed gain-bandwidth product. That is to say, it is impossible to increase the gain of the gain controllable amplifier 18 without decreasing the bandwidth of the gain controllable amplifier 18. Therefore, the effective working bandwidth of the conventional signal processing circuit 10 is restricted by the bandwidth of the gain controllable amplifier 18. The conventional signal processing circuit 10 does not normally operate on high frequency signals or on high information density signals.

SUMMARY OF THE INVENTION

It is therefore a primary object of the claimed invention to provide a signal processing circuit for alternately selecting an attenuator or a gain controllable amplifier to adjust the amplitude of related input signal so as to overcome the above-mentioned problems. The signal processing circuit can decrease the operating power consumption and prevent related signal bandwidth from decreasing.

According to the claimed invention, the signal processing circuit includes an attenuator, a gain controllable amplifier, a control unit, a peak detector circuit, and a waveform adjuster circuit. In the embodiment, the control unit provides a control signal and a select signal for controlling operations of the peak detector circuit and the waveform adjuster circuit. The control signal is directed to both of the attenuator and the gain controllable amplifier for selectively enabling one of the attenuator and the gain controllable amplifier and disabling the other in order to reduce power consumption. The control signal is also used for adjusting the gains of the attenuator and the gain controllable amplifier in the embodiment. The attenuator receives an input signal and attenuates the input signal so as to generate an attenuated output signal, while the gain controllable amplifier is disabled when the attenuator is at work. The gain controllable amplifier receives the input signal and amplifies the input signal so as to derive an amplified output signal while the attenuator is disabled when the amplifier is at work. The peak detector circuit evaluates the envelope amplitude according to the amplified output signal or the attenuated output signal and then transfers the evaluated envelope amplitude to the control unit. The waveform adjuster circuit slices the signal delivered from the attenuator or the gain controllable amplifier according to the indication of the select signal and then generates a digital output signal, wherein the select signal dynamically directs the peak detector circuit and the waveform adjuster circuit to receive the attenuated output signal or the amplified output signal transferred from the attenuator and gain controllable amplifier, respectively.

In another embodiment, a signal processing method is disclosed for enabling one of the attenuator and gain controllable amplifier to adjust the signal amplitude of an input signal at a time. The signal processing method includes attenuating the input signal and generating a corresponding attenuated output signal, wherein the attenuator and the gain controllable amplifier are coupled in parallel; and slicing the waveform of the attenuated output signal to generate a digital output signal. The disclosed method further includes a step of amplifying the input signal and generating a corresponding amplified output signal when the attenuated output signal is less than a first threshold. In the embodiment, the step of attenuating the input signal is halted when the amplifying step is performed, while the amplifying step is halted when the attenuating step is performed so as to reduce power consumption when converting signal format of the input signal.

In a still another embodiment, a signal processing method is disclosed for enabling one of the attenuator and gain controllable amplifier to adjust the signal amplitude of an input signal at a time. The signal processing method includes amplifying the input signal and generating a corresponding amplified output signal, wherein the attenuator and the gain controllable amplifier are coupled in parallel; and slicing the waveform of the amplified output signal to generate a digital output signal. The disclosed method further includes a step of attenuating the input signal and generating a corresponding attenuated output signal when the amplified output signal is higher than a second threshold. In the embodiment, the step of attenuating the input signal is halted when the amplifying step is performed, while the amplifying step is halted when the attenuating step is performed.

The present invention can be implemented in the data accessing circuit of optical disc drivers or the like for adjusting signal amplitude deviations caused by different reflection rates of optical discs and/or different gains of optical pickup heads.

BRIEF DESCRIPTION OF THE DRAWINGS

These and other objects of the claimed invention will no doubt become obvious to those of ordinary skill in the art after reading the following detailed description of the preferred embodiment that is illustrated in the various figures and drawings.

DETAILED DESCRIPTION

Figure 1:
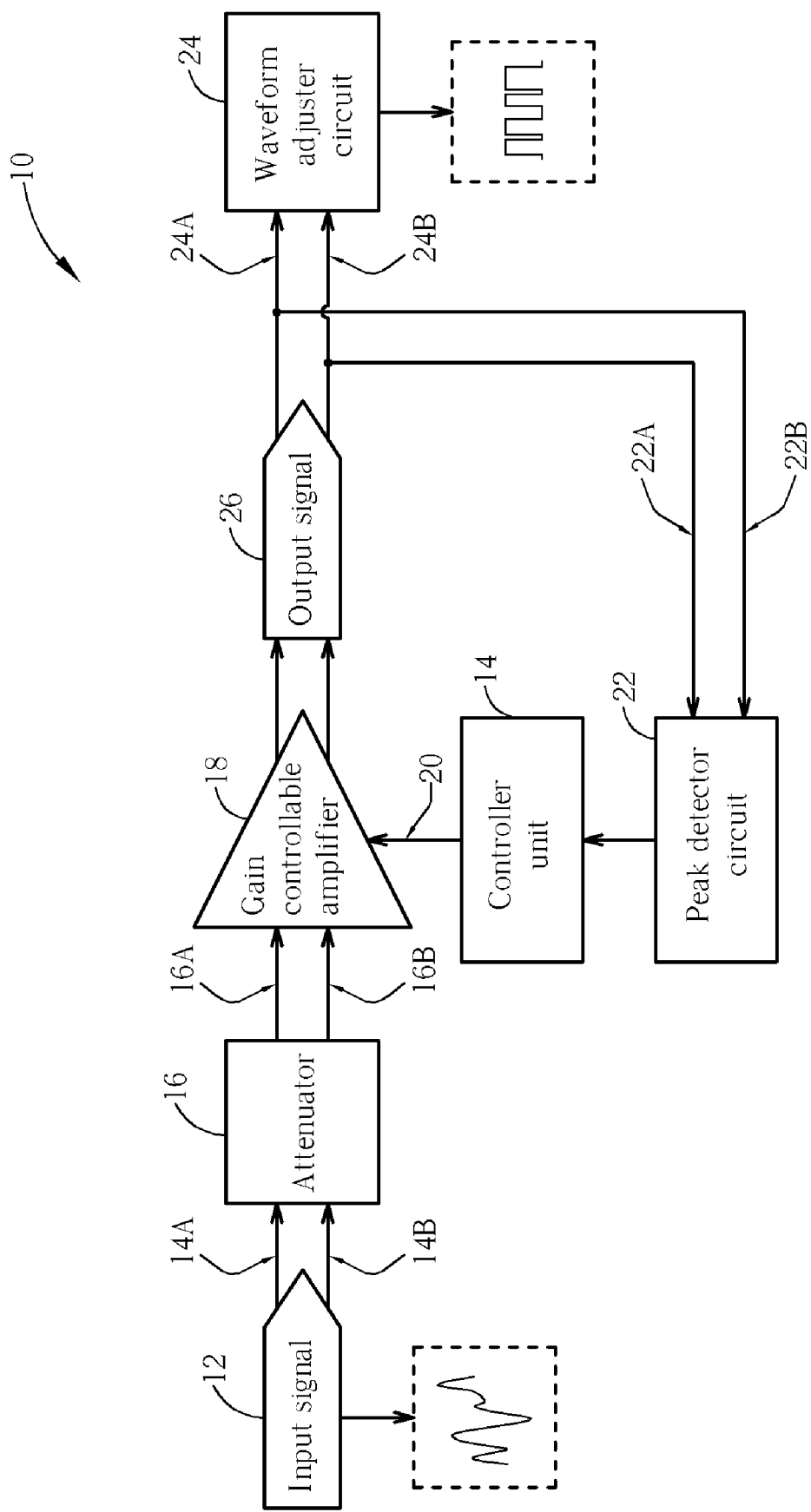
FIG. 1 is a circuit block diagram of a signal processing circuit according to the prior art.
Figure 2:
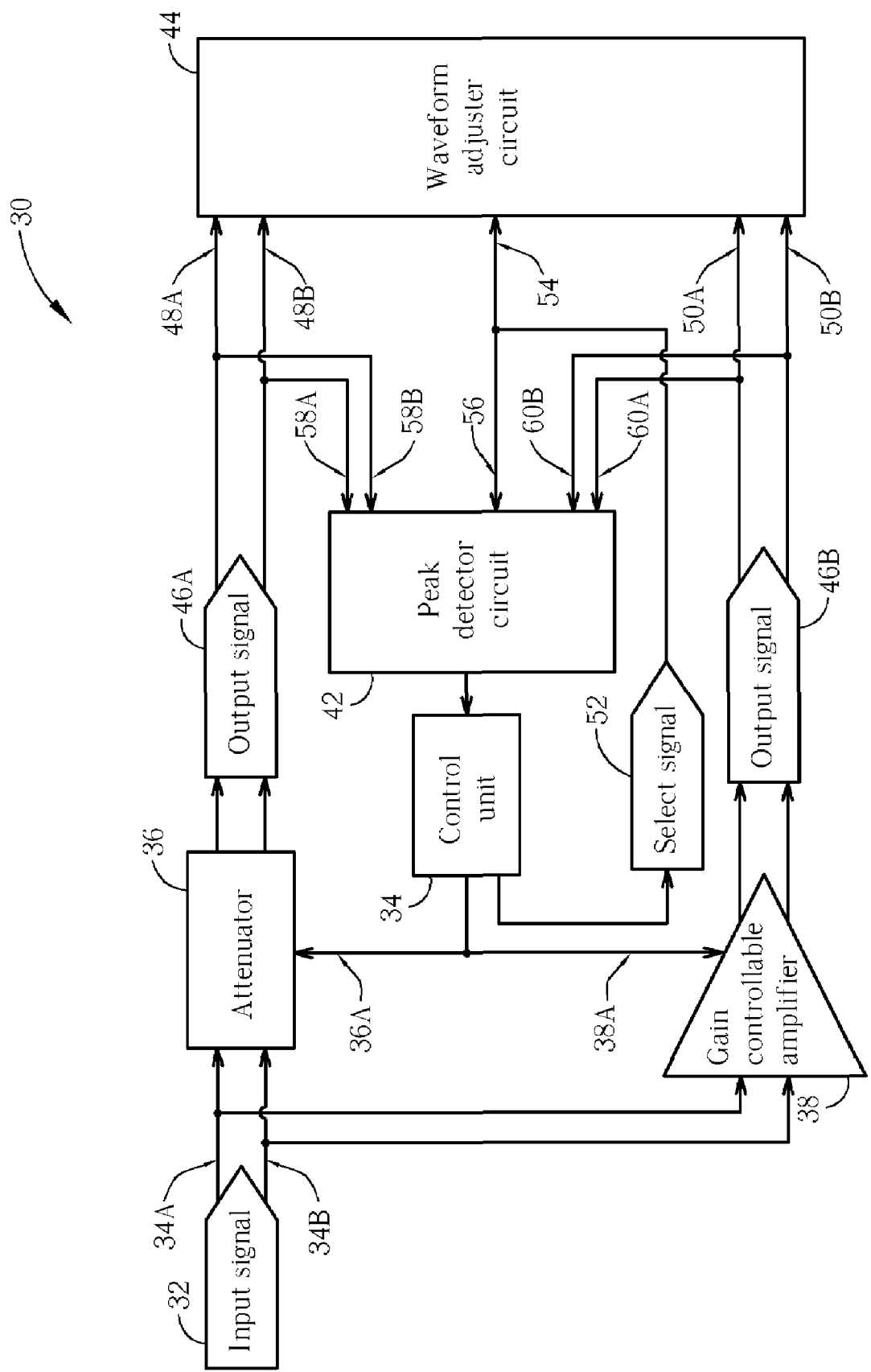
FIG. 2 is a function block diagram of a signal processing circuit according to the present invention.

Please refer to FIG. 2, which is a function block diagram illustrating a signal processing circuit 30 according to the present invention. The signal processing circuit 30 encompasses an attenuator 36, a gain controllable amplifier 38, a control unit 34, a peak detector circuit 42, and a waveform adjuster circuit 44. An input signal 32 fed into the signal processing circuit 30 is in a differential way such that almost all circuit blocks of the signal processing circuit 30 are designed to operate with signals in a differential manner. The gain controllable amplifier 38 and the attenuator 36 are both connected with differential input ends 34A and 34B of the signal processing circuit 30, and both of them couple to the control circuit 34 by means of their control pins 38A and 36A, respectively. The attenuator 36 outputs an output signal 46A to both of the waveform adjuster circuit 44 and the peak detector circuit 42, and the gain controllable amplifier 38 also outputs an output signal 46B directing to the waveform adjuster circuit 44 and the peak detector circuit 42 simultaneously. The control unit 34 provides and feeds related control signal via the control pins 36A and 38A of the attenuator 36 and the gain controllable amplifier 38, respectively. The peak detector circuit 42 is basically a signal envelope detector used for evaluating the envelope amplitude of the input signal. The peak detector circuit 42 has two differential input ends 58A/58B and 60A/60B, an output end and a select end 56, wherein the two differential input ends 58A/58B and 60A/60B respectively receive the output signal 46A and 46B, the output end is connected to the control unit 34, and the select end 56 receives a select signal 52 provided by the control unit 34. The waveform adjuster circuit 44, functioning like a data slicer circuit, can properly transfer an analog signal into a digital one based on a predetermined slice level. The waveform adjuster circuit 44 has two differential input ends 48A/48B and 50A/50B, and a select end 54 used for receiving the select signal 52 provided by the control unit 34. The control unit 34 has an input end and two output ends, wherein the input end receives the envelope amplitude evaluated by the peak detector circuit 42, one of the output end outputs related control signal to the control pins 36A and 38A of the attenuator 36 and the gain controllable amplifier 38, and the other output end delivers the select signal 52 to the select ends 56 and 54 of the peak detector circuit 42 and the waveform adjuster circuit 44. Please note that the select signal 52 may be one of the control signals delivered at the control pins 36A and 38A. For example, a pin used for delivering a signal for disabling or enabling the attenuator 36 and the gain controllable amplifier 38 may be used for delivering the select signal 52. Furthermore, the attenuator 36 and the gain controllable amplifier 38 can be integrated as an amplitude adjusting circuit which encompasses a differential input end (e.g. the input ends 34A/34B) for receiving the input signal 32 and two output ends for respectively delivering an attenuated input signal (e.g. the output signal 46A) and amplified input signal (e.g. the output signal 46B) of the input signal as the indication of the control signal issued from the control unit 34. However, any skilled person should arrange these two circuits according to specific requirements or applications.

The operations of the signal processing circuit 30 of the first embodiment are described as below. Firstly, the attenuator 36 attenuates the input signal 32 and generates corresponding output signal 46A after the input signal 32 is fed into the signal processing circuit 30, while the gain controllable amplifier 38 is disabled and stops issuing the output signal 46B. At this time the select signal 52 enables the peak detector circuit 42 to receive the output signal 46A from the attenuator 36 through the input ends 58A and 58B. The peak detector circuit 42 evaluates the envelope amplitude of the output signal 46A and then transfers the evaluated envelope amplitude to the control unit 34. The control unit 34 controls the gains of the attenuator 36 through the control pins 36A according to the evaluated envelope amplitude of the input signal 46A provided by the peak detector circuit 42. If the envelope amplitude is too small, the control unit 34 disables the attenuator 36 and enables the gain controllable amplifier 38 via related select signal 52 since the attenuator 36 can only attenuate rather than amplify a signal. Therefore, the attenuator 36 is turned off and halts to issue the output signal 46A, while the gain controllable amplifier 38 starts to amplify the input signal 32. Please note that the control unit 34 also adjusts the gain of the gain controllable amplifier 38 according to the envelope amplitude delivered from the peak detector circuit 42 so as to adjust the amplitude of the input signal 32 suitably. The control unit 34 also outputs the select signal 52 to the waveform adjuster circuit 44 and the peak detector circuit 42 to indicate that they should receive the output signal 46B from the gain controllable amplifier 38. Accordingly, the waveform adjuster circuit 44 receives the output signal 46B through the input ends 50A and 50B, and then transforms the data format of the output signal 46B from analog format into a digital one. The peak detector circuit 42 continues to detect the output signal 46B of the gain controllable amplifier 38. Once the peak detector circuit 42 detects that the amplitude of the output signal 46B is too large, which indicates that the amplitude of the input signal 32 cannot be adjustable suitably since the gain controllable amplifier 38 can only amplify rather than attenuate the signal amplitude. At this time the control unit 34 disables the gain controllable amplifier 38 and enables the attenuator 36 by means of related control signal feeding into the control pins 36A and 38A, while related select signal 52 is delivered in order to direct the peak detector circuit 42 to receive the output signal 46A from the attenuator 36 again. The control unit 34 controls the attenuator 36 to attenuate the input signal 32 suitably according to the indication of the control signal at the control pin 36A, and the waveform adjuster circuit 44 switches to receive the output signal 46A through the input ends 48A and 48B. Please note that the two thresholds may reside in the control unit as the bases for comparing with the evaluated envelope amplitude derived by the peak detector circuit 42. For example, if the largest value of the evaluated envelope amplitude is smaller than a first threshold, the signal processing circuit 30 may determine that the envelope amplitude is too small, such that the control unit 34 may disable the attenuator 36 and enable the gain controllable amplifier 38 via related select signal 52. Similarly, the signal processing circuit 30 may determine that the envelope amplitude is too large if the largest value of the evaluated envelope amplitude is larger than a second threshold, such that the control unit 34 may disable the gain controllable amplifier 38 and enable the attenuator 36 via related select signal 52.

The operations of the signal processing circuit 30 of the second embodiment are described as follows. The initial state can be set such that the gain controllable amplifier 38 is activated to amplify the input signal 32 and to generate corresponding output signal 46B, wherein the attenuator 36 is turned off without issuing the output signal 46A. At this time the select signal 52 enables the peak detector circuit 42 to receive the output signal 46B from the gain controllable amplifier 38 through the input ends 60A and 60B. The peak detector circuit 42 then evaluates the envelope amplitude of the input signal 46B and then transfers the evaluated envelope amplitude to the control unit 34. The control unit 34 controls the gain of the gain controllable amplifier 38 through the control pin 36A according to the envelope amplitude of the input signal 46B provided by the peak detector circuit 42. If the evaluated signal amplitude is too large, the control unit 34 disables the gain controllable amplifier 38 and enables the attenuator 36 by means of related control signal at the control pins 36A and 38A, so the gain controllable amplifier 38 is turned off and stops issuing the output signal 46B. At this time the attenuator 36 starts to attenuate the amplitude of the input signal 32. Please note that the control unit 34 also adjusts the gain of the attenuator 36 according to the envelope amplitude evaluated by the peak detector circuit 42. The control unit 34 also issues the select signal 52 to the waveform adjuster circuit 44 and the peak detector circuit 42 so as to direct them to receive the output signal 46A rather than the output signal 46B. Accordingly, the waveform adjuster circuit 44 receives the output signal 46A, which is attenuated suitably, through the input ends 48A and 48B before transforming them into a digital signal. The peak detector circuit 42 continues to detect the envelope amplitude of the output signal 46A from now on. Once the peak detector circuit 42 detects that the amplitude of the output signal 46A is too small, at this time the control unit 34 disables the attenuator 36 and enables the gain controllable amplifier 38 by means of related control signal at the control pins 36A and 38A. Related select signal 52 is also issued from the control unit 34 to the peak detector circuit 42 in order to direct the peak detector circuit 42 to receive the output signal 46B from the gain controllable amplifier 38. Thereafter, related envelope amplitude is then delivered from the peak detector circuit 42 to the control unit 34. Accordingly, the control unit 34 controls the gain controllable amplifier 38 to amplify the input signal 32 suitably by means of related control signal delivering through the control pin 38A, while the waveform adjuster circuit 44 switches to receive the output signal 46B through the input ends 50A and 50B. Please note that the first and second threshold used for the first embodiment may be employed in the second embodiment, too.

In conclusion, the control unit 34 of the embodiment receives the envelope amplitude from the peak detector circuit 42 and then controls the gains of the attenuator 36 or the gain controllable amplifier 38 according to the evaluated envelope amplitude. At the same time the control unit 34 outputs a select signal 52 which is then directed to the control pins 54 and 56 in order to direct the peak detector circuit 42 and the waveform adjuster 44 to receive the output signal 46B of the gain controllable amplifier 38 or the output signal 46A of the attenuator 36. Please note that the gain controllable amplifier 38 is off and stops issuing any output signal when the attenuator 36 is at work. Similarly, the attenuator 36 is off and stops issuing any output signal when the gain controllable amplifier 38 is at work. In other words, the select signal 52 commands the waveform adjuster circuit 44 and the peak detector circuit 42 to receive the output signal 46B while the gain controllable amplifier 38 is at work, and to receive the output signal 46A while the attenuator 36 is at work.

Figure 3:
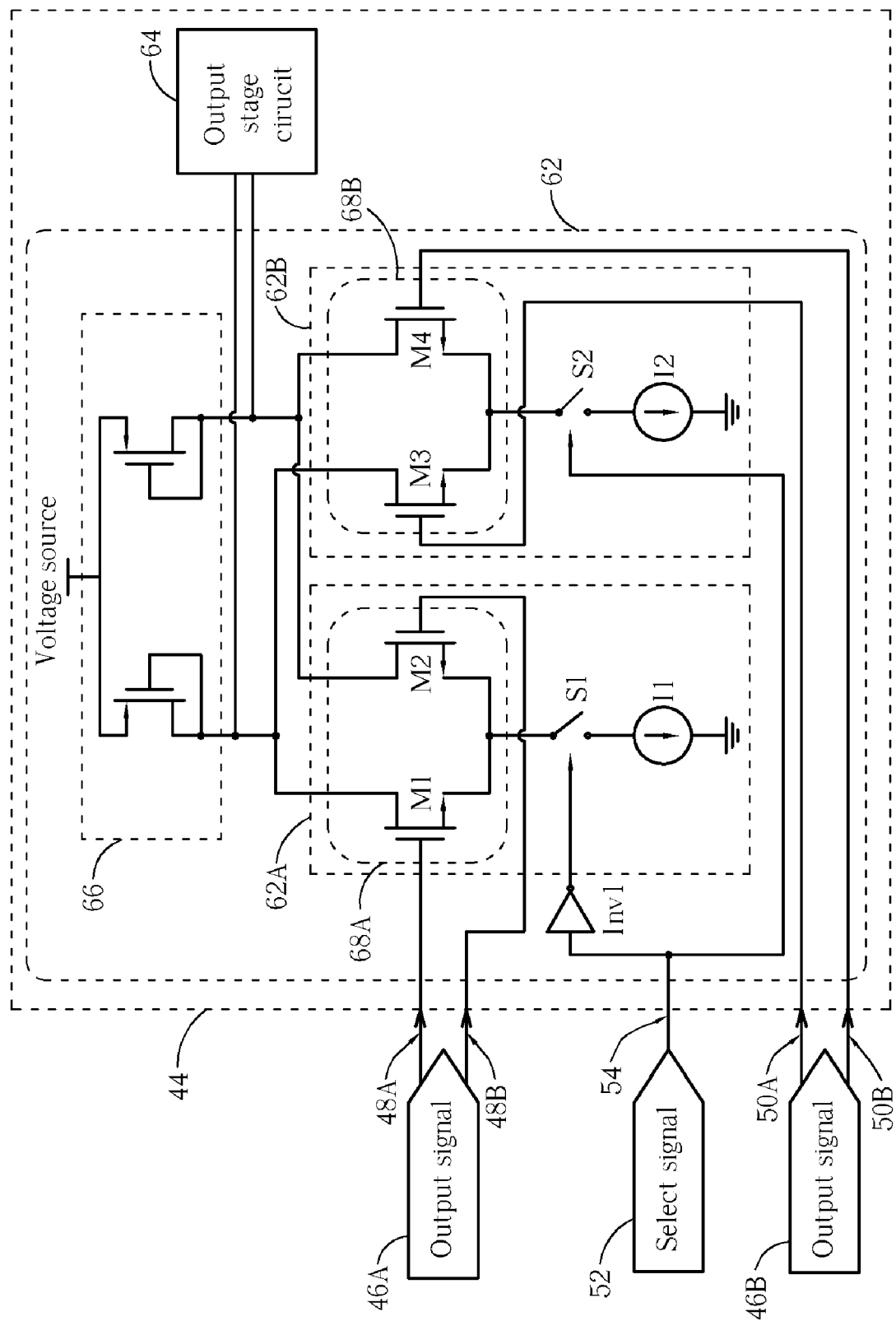
FIG. 3 is a function block diagram of a waveform adjuster circuit shown in FIG. 2.

The difference between the signal processing circuit 30 and the conventional signal processing circuit 10 is that the attenuator 36 and the gain controllable amplifier 38 in the signal processing circuit 30 are connected in parallel, while the attenuator 16 and the gain controllable amplifier 18 are connected in series. Additionally, the input stage circuits of the waveform adjuster circuit 44 and the peak detector circuit 42 are specially designed in order to dynamically receive one of the output signals 46A and 46B. The waveform adjuster circuit 44 is used as an example for further descriptions. Please refer to FIG. 3, which is a function block diagram illustrating the waveform adjuster circuit 44 of FIG. 2. As mentioned previously, the waveform adjuster circuit 44 receives the differential-form output signal 46A of the attenuator 36 via the input ends 48A/48B or receives the output signal 46B via the input ends 50A/50B, and receives the select signal 52 through the control pin 54. The waveform adjuster circuit 44 includes an input stage circuit 62 and an output stage circuit 64. The difference between the waveform adjuster circuit 44 and the conventional waveform adjuster circuit 24 is that the input stage circuit 62 has an additional differential input stage circuit 62A (or 62B) for receiving another corresponding differential input signal 46A (or 46B). Furthermore, the output stage circuit 64 is a data slicer for transferring the output signal 46A or 46B into digital form that performs the same function with the output stage circuit of the conventional waveform adjuster circuit 24. The input stage circuit 62 has two differential input stage circuits, 62A and 62B, incorporated respectively with a corresponding differential pair 68A and 68B. The differential pair 68A includes transistors M1 and M2 whereas the differential pair 68B encompasses transistors M3 and M4. These two differential pairs 68A and 68B respectively receive differential form output signals 46A and 46B. A load circuit 66 provides a load (usually an active load) to these two differential pairs 68A and 68B so as to transfer the differential input stage circuits 62A and 62B as required one for the output stage circuit 64, wherein the load circuit 66 is implemented by resistors or MOS diode connection as shown in FIG. 3. The load circuit 66 is also connected to a voltage source. In addition, current sources I1 and I2 provide bias currents to these two differential circuits 68A and 68B, respectively. There are also two switches S1 and S2 incorporated between the current sources I1 and I2 and the differential pair 68A and 68B. The switches S1 and S2 control whether the differential pairs 68A and 68B accept bias current provided by the current sources I1 and I2, respectively. For example, if the switch S1 is open, the differential pair 68A flows no bias current and thus turns off, such that the differential input stage circuit 62A will not receive the output signal 46A via the input ends 48A and 48B. The select signal 52 controls the open/close statuses of the switches S1 and S2 as shown in FIG. 3, therefore the waveform adjuster circuit 44 receives the output signal 46A or 46B alternatively. The exemplary circuit diagram of the waveform adjuster circuit 44 is depicted in FIG. 3 wherein the select signal 52 controls the switch S1 after an inverter $Inv_1$ inverts its signal status.

When the signal processing circuit 30 (FIG. 2) according to the present invention is at work, the select signal 52 directs the waveform adjuster circuit 44 and the peak detector circuit 42 to receive the output signal 46A or 46B. For example, a high voltage state select signal 52 controls the waveform adjuster circuit 44 to receive the output signal 46B. Under this scenario, the select signal 52 directs the switch S2 to be closed and makes the differential pair 68B obtain bias current provided by the current source I2. The differential input stage circuit 62B, therefore, receives the output signal 46B and transmits the signal 46B to the latter circuit 64 for a necessary manipulation. Simultaneously, the select signal 52 inverted by the inverter $Inv_1$ forces the switch S1 to be opened. Accordingly, the differential pair 68A stops receiving bias current source I1, and the differential input stage circuit 62A stops working and will not receive the output signal 46A. This achieves the purpose that the waveform adjuster circuit 44 selectively receives either the output signal 46A or 46B.

The special design in the input stage circuit 62 of the waveform adjuster circuit 44 not only can achieve the objective of receiving the output signals 46A and 46B alternatively, but also can guarantee that the bandwidth of differential form signal is wide enough. If a switch is directly positioned on a transmission route of the output signal 46A or 46B, the bandwidth decrease depends on an electrical characteristic of the switch device itself. In the input stage circuit 62A according to the present invention, the operations of related switches are controlled by a bias circuit (e.g. the current source I1, I2) of the differential input stage circuits 62A, 62B, rather than directly by differential signals on the transmission route. This will guarantee that bandwidth of output signal 46A or 46B will not decrease after being transmitted to the waveform adjuster circuit 44. Of course, no power is consumed since an open switch blocks related bias current source from flowing through the corresponding input stage circuit.

Figure 4:
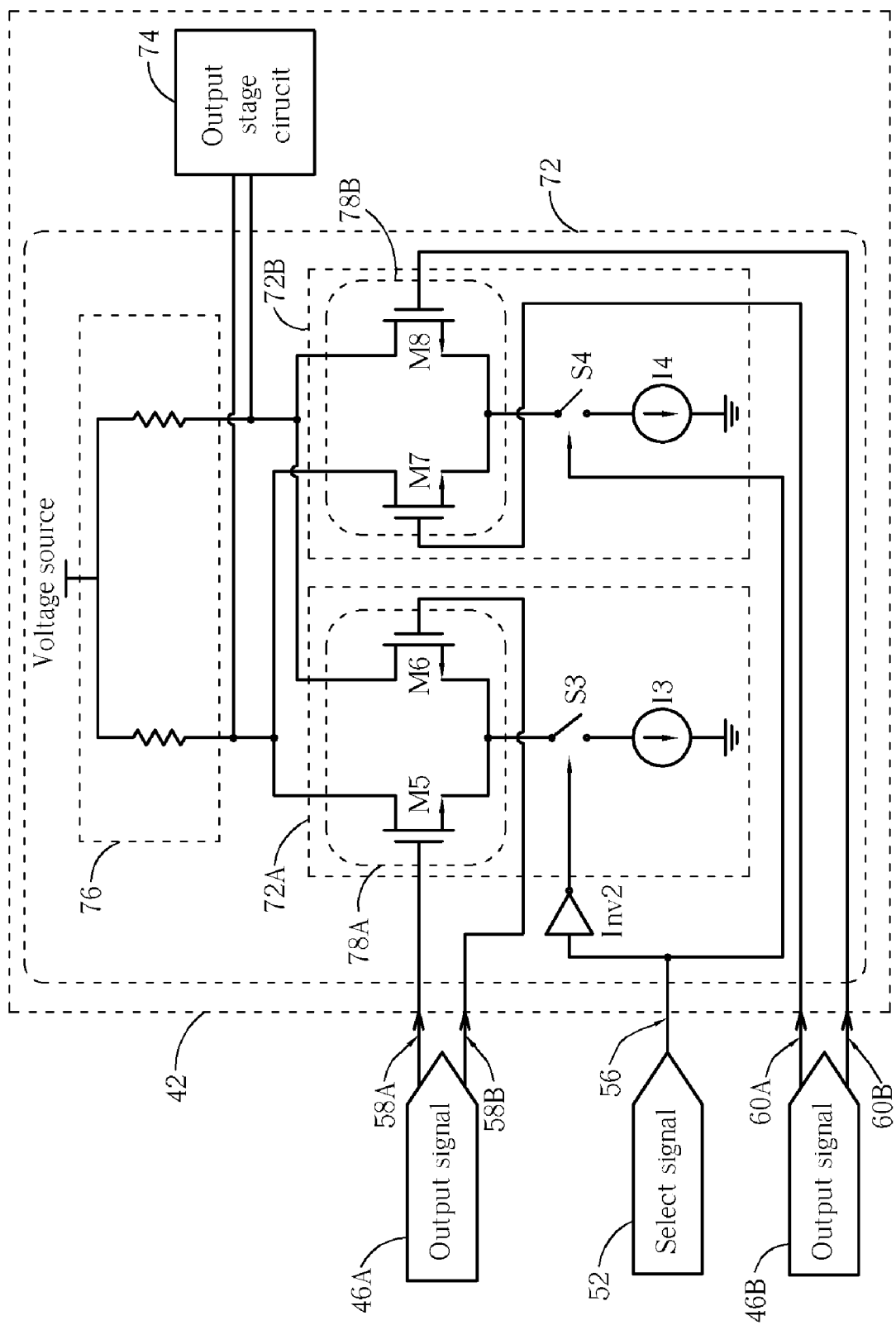
FIG. 4 is a function block diagram of a peak detector circuit shown in FIG. 2.

According to a same design concept, since the peak detector circuit 42 is controlled by the select signal 52 and alternately receives output signals 46A and 46B, another input stage circuit with the same configuration as the input stage circuit 62 can be used in order to guarantee that a switch device does not affect related signals bandwidth. Please refer to FIG. 4, which demonstrates a function block diagram of the peak detector circuit 42 shown in FIG. 2. As mentioned previously, the peak detector circuit 42 receives the differential-form output signal 46A of the attenuator 36 via the input ends 58A and 58B, or receives the output signal 46B from the gain controllable amplifier 38 via the input ends 60A and 60B. Similarly, the peak detector circuit 42 also receives the select signal 52 through the control pin 56. The peak detector circuit 42 includes an input stage circuit 72 and an output stage circuit 74. The difference between the peak detector circuit 42 and the peak detector circuit 22 of the conventional signal processing circuit 10 is that the input stage circuit 72 has an additional differential input stage circuit 72A (or 72B) for another corresponding differential input signal 46A (or 46B), and the output stage circuit 74 is a data slicer for transferring the signal to the digital signal which is the same with the output stage circuit of the peak detector circuit 22. The input stage circuit 72 has two differential input stage circuits, 72A and 72B, respectively constructed by a corresponding differential pair 78A and 78B. The differential pair 78A basically contains of transistors M5 and M6 whereas the differential pair 78B contains transistors M7 and M8. These two differential pairs 78A and 78B respectively receive the differential form output signals 46A and 46B. A load circuit 76 provides a load (usually an active load) to the two differential pairs in order to transfer the differential signal of the differential input stage circuits 72A and 72B to a format adapted to the output stage circuit 74, wherein the load circuit 76 is implemented with resistors or MOS diode connections, as the load circuit 76 in FIG. 4. One end of the load circuit 76 is connected to a voltage source. In addition, current sources I3 and I4 provide bias currents to these two differential circuits 78A and 78B, respectively. There are also two corresponding switches S3/S4 respectively positioned between the current sources I3/I4 and the differential pair 78A/78B. The switches S3 and S4 control whether the differential pairs 78A and 78B accept bias current provided by the current sources I3 or I4. For example, if the switch S3 is open, the differential pair 78A will be turned off since there is no bias current flowing through it, such that the differential input stage circuit 72A is off and does not receive the output signal 46A via the input ends 58A. The select signal 52 controls whether the switches S3 and S4 are open or not. Additionally, the select signal 52 also controls the status of the switch S4 because the peak detector circuit 42 receives the output signal 46A or 46B in an alternating way. In the embodiment, the select signal 52 controls the switch S3 after an inverter $Inv_2$ inverts its signal status.

When the signal processing circuit 30 according to the present invention is operating, the select signal 52 directs the waveform adjuster circuit 44 and the peak detector circuit 42 to receive the output signal 46A or 46B. For example, when the select signal 52 is at a high voltage state, it will direct the peak detector circuit 42 to receive the output signal 46B since the select signal 52 directs the switch S4 to be closed so as to make the differential pair 78B obtaining bias current provided by the current source I4. The differential input stage circuit 72B is therefore enabled to receive the output signal 46B and transmits the signal 46B to the latter circuit 74 for a necessary manipulation. Simultaneously, the select signal 52 processed by the inverter $Inv_2$ will open the switch S3 such that the differential pair 78A does not obtain bias current from current source I3. Therefore, the differential input stage circuit 72A is disabled and is incapable of receiving the output signal 46A. This achieves the goal that the peak detector circuit 42 selectively receives either output signal 46A or 46B.

Compared with a conventional signal processing circuit 10 that simultaneously enables the attenuator 16 and the gain controllable amplifier 18, the signal processing circuit 30 according to the present invention selectively enables the attenuator 36 or the gain controllable amplifier 38 to manipulate the input signal. In other words, the non-selected one will not operate or generate any output signal while the selected one is operating and issuing related output signals. Thus, the signal processing circuit 30 can reduce power consumption while operating. Furthermore, the conventional first-attenuating-then-amplifying operation mode decreases related amplifier bandwidth resulting in the decrease of the output signal bandwidth because the gain controllable amplifier needs to provide a larger gain to compensate the loss of an attenuated input signal. On the contrary, the signal processing circuit 30 only enables either the gain controllable amplifier or the attenuator at a time. The input signal is not first reduced by an attenuator and then amplified by an gain controllable amplifier, which also indicates that the gain of the gain controllable amplifier gain need not be too large. The bandwidth of the gain controllable amplifier increases accordingly so as to maintain that of the output signal. The present invention also discloses a special design for an input stage circuit of the waveform adjuster circuit 44 and the peak detector circuit 42, which can decrease power consumption and maintain the signal bandwidth simultaneously.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A signal processing circuit of a compact disk drive for adjusting an input signal and transforming a data format of the input signal from analog to digital, the signal processing circuit comprising:
   an amplitude adjusting circuit for adjusting the amplitude of the input signal, having a first differential input end, a first differential output end and a second differential output end, wherein the first differential input end receives the input signal, the first differential output end outputs a first output signal, and the second differential output end outputs a second output signal;
   a control unit having a first input signal end, a first output signal end and a second output signal end, wherein the two output signal ends provide a control signal and a select signal respectively, the control signal is transferred to the amplitude adjusting circuit as an indication that the first output signal or the second output signal is issued;
   a peak detector circuit having a second differential input end, a third differential input end, a first select end and a third output signal end, wherein the second differential input end and the third differential input end respectively receive the first output signal and the second output signal such that the peak detector circuit evaluates an envelope amplitude of the first output signal and the second output signal as an indication of the select signal, the first select end receives the select signal from the control unit for selecting one of the first output signal and the second output signal as the indication of the select signal, and the third output signal end is coupled to the first input signal end of the control unit; and
   a waveform adjuster circuit for generating a digital signal having a fourth differential input end, a fifth differential input end, a second select end and a fourth output signal end, wherein the fourth differential input end and the fifth differential input end receive the first output signal and the second output signal respectively, the second select end receives the select signal from the control unit for selecting one of the first output signal and the second output signal as the indication of the select signal, and the fourth output signal is the digital signal derived according to the first output signal or the second output signal as the indication of the select signal.

2. The signal processing circuit of claim 1 wherein the amplitude adjusting circuit comprises:
   an attenuator for attenuating the input signal, having a first input end coupling to the first differential input end for receiving the input signal, a first output end coupling to the first differential output end for issuing the first output signal, and a first control end receiving the control signal such that whether the first output signal is issued from the attenuator is controlled according to the indication of the control signal; and a gain controllable amplifier for amplifying the input signal, having a second input end coupling to the first differential input end for receiving the input signal, a second output end coupling to the second differential output end for issuing the second output signal, and a second control end receiving the control signal such that whether the second output signal is issued from the gain controllable amplifier is controlled according to the indication of the control signal.

3. The signal processing circuit of claim 2 wherein the control unit adjusts gains of the attenuator and the gain controllable amplifier by means of the control signal.

4. The signal processing circuit of claim 1 wherein the peak detector circuit is a signal envelope detector which evaluates the envelope amplitude of the first output signal or the second output signal according to the indication of the select signal.

5. The signal processing circuit of claim 1 wherein the waveform adjuster circuit comprises:
- an input stage circuit for receiving the first output signal, the second output signal, and the select signal; and
- an output stage circuit for generating the digital signal of the first output signal or the second output signal according to the indications of the select signal.

* * * * *